United States Patent [19]

Gundry

[11] 3,921,104

[45] Nov. 18, 1975

[54] ADJUSTABLE EQUALIZERS USEABLE IN AUDIO SPECTRUM

[75] Inventor: Kenneth James Gundry, London, England

[73] Assignee: Dolby Laboratories, Inc., New York, N.Y.

[22] Filed: Nov. 18, 1974

[21] Appl. No.: 524,827

[30] Foreign Application Priority Data

Nov. 19, 1973 United Kingdom............... 53514/73

[52] U.S. Cl................ 333/28 R; 179/1 D; 179/1 P; 333/28 T; 328/167

[51] Int. Cl.$^2$........................................... H03H 7/16

[58] Field of Search......... 333/28 R, 28 T; 328/167; 179/1 D, 1 P

[56] References Cited

UNITED STATES PATENTS

| | | | |
|---|---|---|---|
| 2,485,751 | 10/1949 | Larsen | 333/28 T X |
| 2,587,081 | 2/1952 | Albin | 333/28 T X |
| 2,907,838 | 10/1959 | Ross | 333/28 R UX |

*Primary Examiner*—Paul L. Gensler
*Attorney, Agent, or Firm*—Robert F. O'Connell

[57] ABSTRACT

In an equalizer using multiple, parallel-connected band-pass filters, the filters are removed from the signal path and connected to tap off inputs from the signal path and feed back outputs to combining means in the signal path. Adjustable potentiometers on the input or output side of the filters adjust the boost or cut in the bands of the filters individually. Failure of a filter results in a flat response in the corresponding band, not a notch as in prior art equalizers.

20 Claims, 6 Drawing Figures

ADJUSTABLE EQUALIZERS USEABLE IN AUDIO SPECTRUM

This invention relates to adjustable signal equalizers, particularly, but not exclusively, equalizers for adjusting the frequency response in the audio spectrum. Equalizers which provide for independent adjustment of the response in a plurality of frequency bands are proving increasingly useful in recording studios and in audio reproducing installations. Known equalizers capable of such adjustment can be divided broadly into two types.

In parallel mode equalizers, a number of band-pass filters, each with an associated gain control, have their inputs fed from a common source and their outputs connected together. The only path from input to output is via the filters, and as a result the smoothest frequency response, achieved when the gains of all the filters are set to be equal, depends upon the manner in which the individual filter responses add together. A compromise has to be made between minimum interaction of the filters, requiring sharp cut-off characteristics at each band boundary, and ripple in the response, requiring gentle cut-off characteristics. In equipment of this type, the output noise is the sum of the noise contributions of the filters, and if one filter should fail, the result is a large notch in the overall response.

In tandem mode equalizers, a number of circuits are connected in tandem, each circuit having a flat response except over a limited band where the response can be adjusted. The available adjustment normally consists of either (but not both) adjustment between flat and maximum boost or adjustment between flat and maximum cut. A complex circuit is required if the possibility of selectively providing boost and cut by adjustment is to be made available. The tandem connection leads to noise problems and failure of one filter results in total failure of the equalizer.

The object of the present invention is to provide an improved equalizer which introduces less noise than the known equalizers described above, which enables boost or cut to be selected at will in any band and in which a failure in one band has no worse effect than rendering the response in that band flat.

According to the present invention invention, there is provided a signal equalizer comprising a signal path extending from an input terminal through two combining circuits to an output terminal, a plurality of band-pass filters having their inputs connected to a point between the two combining circuits and their outputs connected to adjustable taps of potentiometers individual to the filters, the two ends of each potentiometer being connected to the combining circuits respectively to contribute two signal components to the signal passing from the input terminal to the output terminal, which components are equal at an intermediate setting of the potentiometer, and the relative phases of the signals throughout the equalizer being such that the two signal components contributed by each potentiometer boost the signal passing from the input terminal to the output terminal at one combining circuit and cut this signal at the other combining circuits.

When the two components from any filter are equal, the boost created by one component is exactly cancelled by the cut created by the other component and noise in the output of the filter is also cancelled. The response in the corresponding frequency band is, therefore, flat. If one filter fails, it provides no components to the two combining circuits and the response in the corresponding band reverts to flat. In normal operation, however, and with the tap adjusted so that one component is larger than the other, the action of the larger component will preponderate to provide boost or cut in the corresponding band.

According to the invention in another aspect, there is provided a signal equalizer comprising a signal path extending from an input terminal to an output terminal through a combining circuit, a plurality of band-pass filters having their outputs connected to the combining circuit and their inputs connected to adjustable taps of potentiometers individual to the filters, the two ends of the potentiometers being connected to the input and output terminals respectively, and inverting means so arranged that the phase of the signal at one end of each potentiometer is inverted relative to the phase of the signal at the other end of the potentiometer.

Each filter thus receives two signal components, one from the input and one from the output of the equalizer, one such component being phase-inverted with respect to the other, and the relative proportions being dependent upon the setting of the individual potentiometers. When the components are equal, the filter receives no input, and no signal within the filter band passes to the combining circuit. When the components are unequal, a signal passes to the combining circuit and is conbined with the equalizer input signal with a resulting boost or cut in the output signal of the equalizer in accordance with the relative phases of the combined signals.

The two aspects of the invention will be seen to be complementary to each other, the only difference being that, in the first aspect the potentiometers proportionate counteracting components from the filters, whereas, in the second aspect the potentiometers proportionate counteracting components to the filters.

The invention will be described in more detail, by way of example, with reference to the accompanying drawings, in which.

Figure 1:
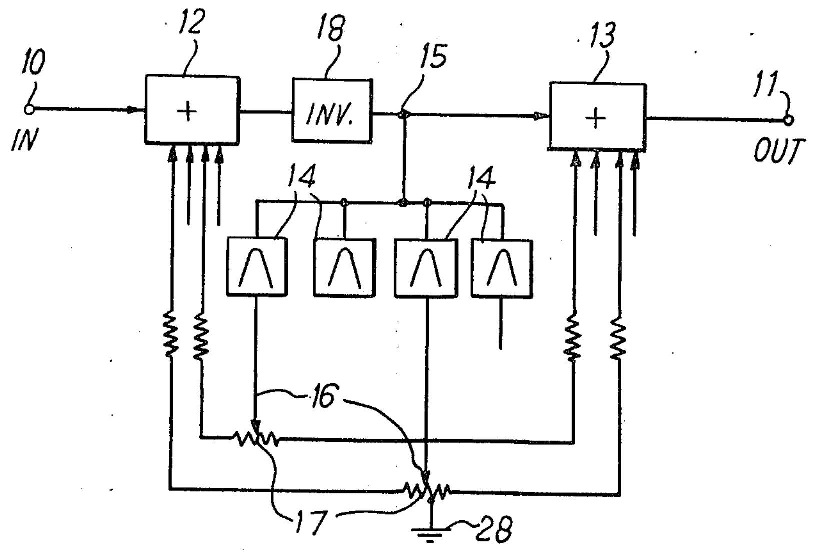
FIGS. 1 and 2 are block diagrams of two basic embodiments of the invention.

Referring to FIG. 1, a signal path extends from an input terminal 10 to an output terminal 11 through a first combining circuit 12 and a second combining circuit 13. A plurality of band-pass filters 14, whose pass bands together cover the frequency spectrum of interest, have their inputs connected in common to a point 15 lying between the two combining circuits. The outputs of the filters are connected to adjustable taps 16 of potentiometers 17 whose ends are connected in each case to the combining circuits 12 and 13 respectively. The potentiometers provide feedback components to the combining circuit 12 and feed-forward components to the combining circuit 13. In order that one set of components shall provide boost and the other set shall provide cut, an inverter 18 is inserted between the circuit 12 and the point 15. If the filters 14 are non-inverting, the components fed to the circuit 12 provide cut (the feedback loop is inverting) and the components fed to the circuit 13 provide boost (the feed-forward path from point 15 is non-inverting). Considering any one filter 14, if its tap 16 is at the centre of the potentiometer, the cut and boost components are equal and the response in the corresponding band is flat. If the tap is shifted to the left, the cut component preponderates, giving net cut in the corresponding band; if the tap is shifted to the right, the boost component preponderates, giving net boost in the corresponding band.

If, however, the filters 14 are inverting, the components applied to the circuits 12 and 13 provide boost and cut respectively and the taps have to be adjusted left and right to provide boost and cut respectively.

Figure 2:
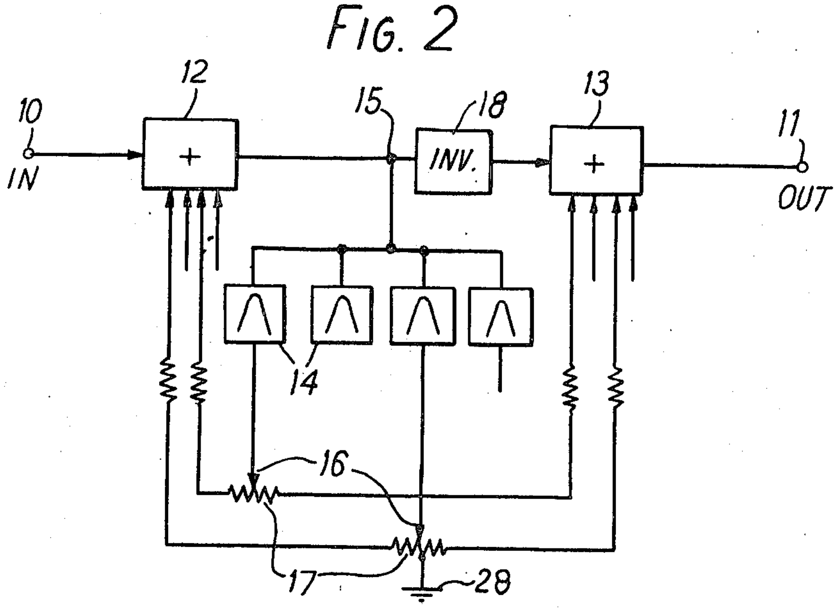

FIG. 2 differs from FIG. 1 only in that the inverter 18 is removed and replaced by an inverter 18′ between point 15 and the circuit 13. If now the filters are non-inverting, boost and cut are provided at circuits 12 and 13 respectively, while, if the filters are inverting, cut and boost are provided at circuits 12 and 13 respectively.

In both FIGS. 1 and 2, the potentiometers 17 may have, in addition to adjustable taps 16, fixed taps, usually but not necessarily at the mid-point, these fixed taps being connected to earth 28. When the position of an adjustable tap coincides with that of a fixed tap, the cut and boost components in the appropriate band are intrinsically reduced to zero with a resultant flat response, whether or not the gains of the cut and boost paths are equal.

It will be appreciated that other inverting stages can be included as necessary, provided that, if the feedback loop as a whole is inverting, the feed-forward loop provides boosting components at the circuit 13, whereas, if the feedback loop as a whole is non-inverting, the feed-forward loop provides cut or bucking components at the circuit 13.

Figure 3:
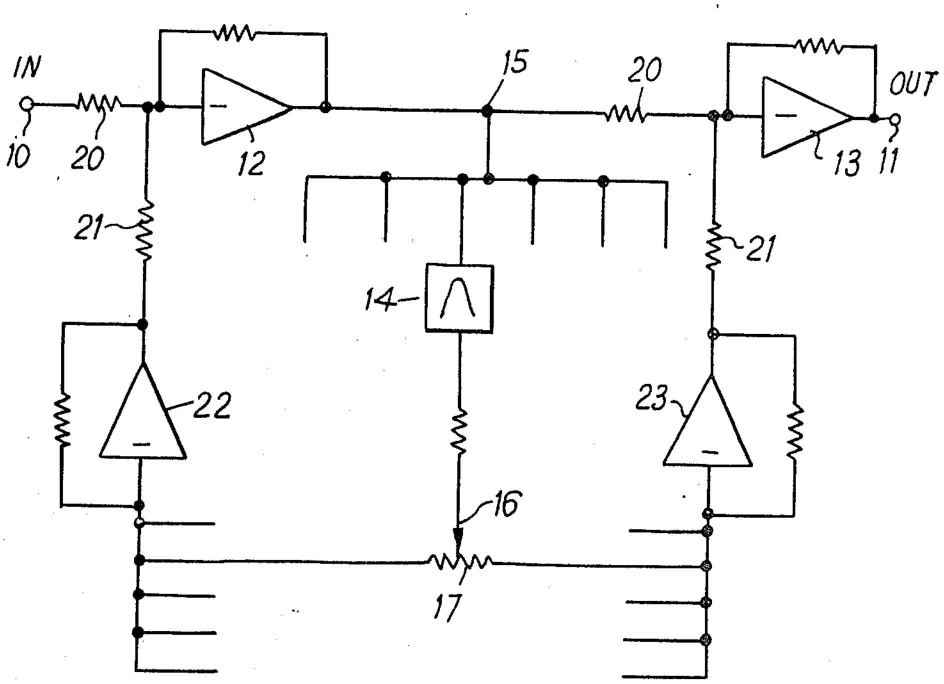
FIG. 3 is a diagram of a practical circuit.

This is illustrated in the practical circuit of FIG. 3 where the combining circuits of 12 and 13 are constituted by inverting operational amplifiers with input resistors 20 in the circuit path from terminal 10 to terminal 11 and resistors 21 for adding in the feedback and feed-forward components. The filters 14 are phase inverting. Further inverting operational amplifiers 22 and 23 are used to combine the left-hand components and the right-hand components respectively from the potentiometers 17, to provide combined feedback and feed-forward components for application to the resistors 21.

There are thus three inverting stages in the feedback loop, (amplifiers 12 and 22 and filters 14), giving net inversion around the loop. Therefore, cut components are introduced via the amplifier 22 to the amplifer 12.

The feed-forward loop contains two inverting stages and is, therefore, non-inverting as a whole and introduces boost components via the amplifier 23 to the amplifier 13.

Figure 4:
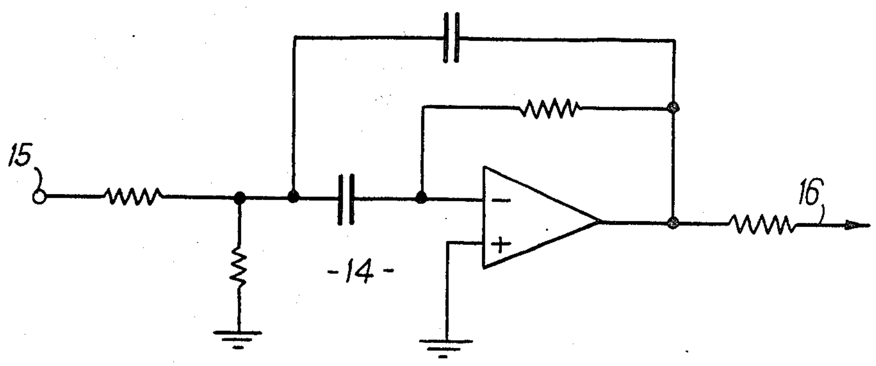
FIG. 4 is a circuit diagram of an active filter for use in the circuit of FIG. 3.

In an audio circuit covering a nine octave audio spectrum, the filters 14 can be twenty seven phase-inverting active filters at third octave intervals. FIG. 4 shows one suitable circuit configuration, the component values being selected for each filter to tune to the centre of the corresponding band. When a tap 16 is at either extreme of its potentiometer 17, maximum boost or cut is achieved and the maximum amount may be ± 8 dB.

Figure 5:
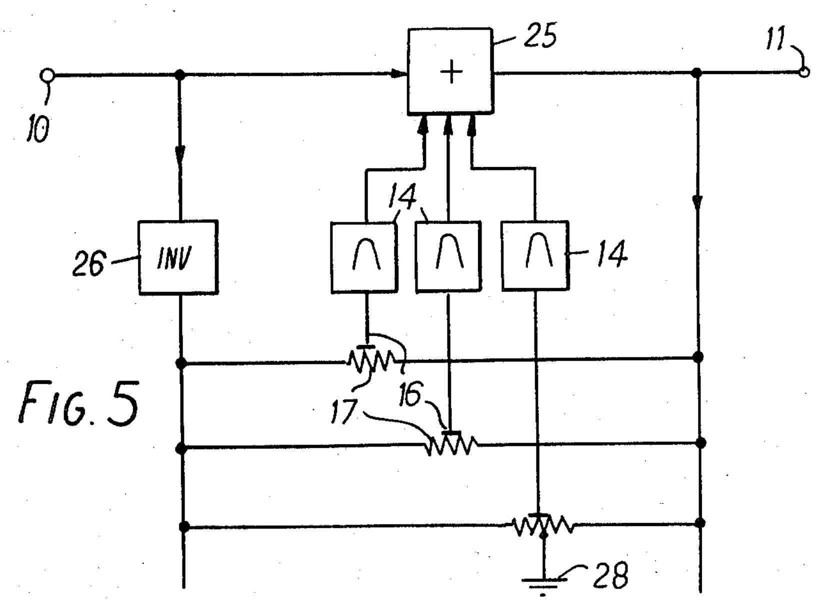
FIGS. 5 and 6 are block diagrams of two embodiments of the second aspect of the invention.

In the embodiment of FIG. 5, a signal equalizer comprises a signal path extending from an input terminal 10 through a combining circuit 25 to an output terminal 11. A plurality of non-inverting or inverting bandpass filters 14 have their outputs connected to the circuit 25 and their inputs connected to adjustable taps 16 of potentiometers 17. The two ends of the potentiometers are connected to the input terminal 10 and output terminal 11 respectively, one such connection (as illustrated, that to the input terminal 10) being via a phase inverter 26.

Figure 6:
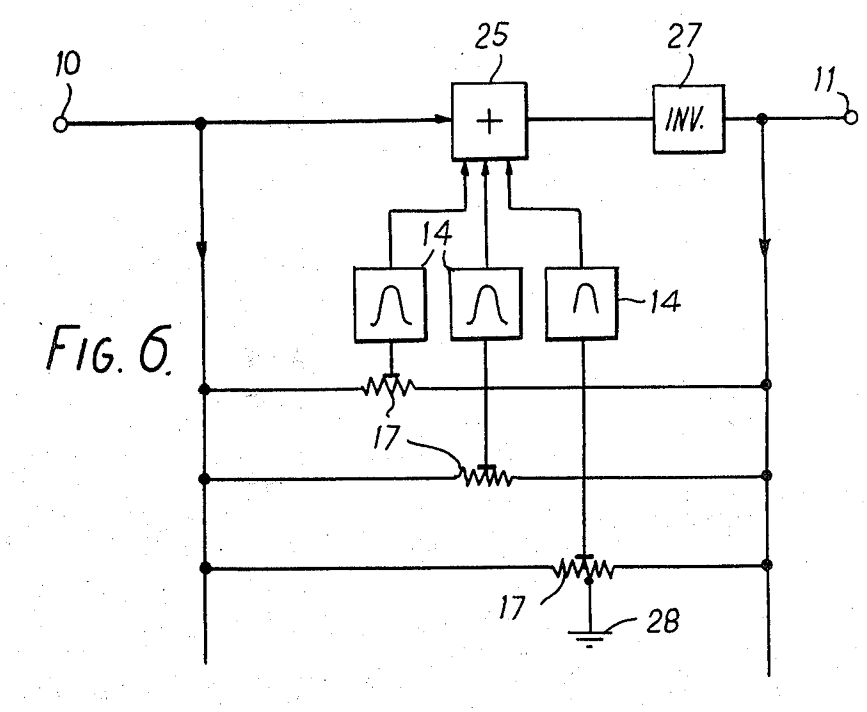

As shown in FIG. 6, the ends of the potentiometers may alternatively be connected directly to the input and output terminals without a phase inverter, if instead a phase inverter 27 is connected between either the input or the output terminal and the combining circuit, the inverter 27 being shown between the combining circuit and output terminal.

In addition to adjustable taps, the potentiometers may have fixed taps connected to ground, in which case each filter receives only one input signal component of adjustable amplitude coming either from the input or the output of the equalizer depending upon the relative positions of the fixed and adjustable taps. When the taps are in the same position a flat response is obtained; in other positions of the adjustable taps either boost or cut is obtained, depending upon the relative phases of the combined signals. Fixed, grounded taps 28 are shown illustratively for one potentiometer only in each of FIGS. 1, 2, 5 and 6.

I claim:

1. A signal equalizer, comprising a signal path extending from an input terminal to an output terminal, two series-connected combining circuits in said path, a plurality of band-pass filters having their inputs connected to a point between the two combining circuits, a plurality of potentiometers individual to the filters and having adjustable taps, the outputs of the filters being connected to the adjustable taps respectively, and the two ends of each potentiometer being connected to the combining circuits respectively to contribute two signal components to the signal passing from the input terminal to the output terminal, which components are equal at an intermediate setting of the potentiometer, and the relative phases of the signals throughout the equalizer being such that the two signal components contributed by each potentiometer boost the signal passing from the input terminal to the output terminal at one combining circuit and cut this signal at the other combining circuit.

2. A signal equalizer according to claim 1, wherein both combining circuits combine all signals applied thereto additively.

3. A signal equalizer according to claim 2, wherein the signal provided by the first combining circuit at the said point is phase inverted.

4. A signal equalizer according to claim 2, wherein the signal provided by the first combining circuit at the said point is non-phase inverted.

5. A signal equalizer according to claim 1, wherein both combining circuits combine all the signals supplied thereto from the potentiometers additively and subtract the resulting signal components from the input signal and the signal at the said point respectively.

6. A signal equalizer according to claim 1, wherein the filters are non-inverting.

7. A signal equalizer according to claim 1, wherein the filters are phase-inverting.

8. A signal equalizer according to claim 1, wherein the filters are active filters.

9. A signal equalizer according to claim 1, wherein the filters are spaced at one-third octave intervals.

10. A signal equalizer according to claim 1, wherein the potentiometers also have fixed taps connected to earth.

11. A signal equalizer according to claim 10, wherein the fixed taps are at the mid-points of the potentiometers.

12. A signal equalizer comprising a signal path extending from an input terminal to an output terminal, a combining circuit in said path, a plurality of band-pass filters having their outputs connected to the combining circuit, a plurality of potentiometers individual to the filters and having adjustable taps, the inputs of the filters being connected to the adjustable taps respectively, the two ends of the potentiometers being connected to the input and output terminals respectively, and inverting means so arranged that the phase of the signal at one end of each potentiometer is inverted relative to the phase of the signal at the other end of the potentiometer.

13. A signal equalizer according to claim 12, wherein the inverting means comprise an inverter between one of the input and output terminals and the ends of the potentiometers connected thereto.

14. A signal equalizer according to claim 12, wherein the inverting means comprise an inverter in the signal path between the combining means and one of the input and output terminals.

15. A signal equalizer according to claim 12, wherein the filters are non-inverting.

16. A signal equalizer according to claim 12, wherein the filters are phase-inverting.

17. A signal equalizer according to claim 12, wherein the filters are active filters.

18. A signal equalizer according to claim 12, wherein the filters are spaced at one-third octave intervals.

19. A signal equalizer according to claim 12, wherein the potentiometers also have fixed taps connected to earth.

20. A signal equalizer according claim 19, wherein the fixed taps are at the mid-points of the potentiometers.

* * * * *